(12) United States Patent
Keil et al.

(10) Patent No.: US 10,692,651 B2
(45) Date of Patent: Jun. 23, 2020

(54) INDUCTION COIL UNIT HAVING A FIBER REINFORCED FERRITE CORE

(71) Applicant: Bayerische Motoren Werke Aktiengesellschaft, Munich (DE)

(72) Inventors: Cornelius Johan Kalle Keil, Goslar (DE); Stefan Opl, Munich (DE); Hartmut Eggers, Munich (DE); Josef Krammer, Kolzkirchen (DE); Tobias Mueller, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/839,929

(22) Filed: Dec. 13, 2017

(65) Prior Publication Data
US 2018/0114636 A1 Apr. 26, 2018

Related U.S. Application Data (63) Continuation of application No. PCT/EP2016/069458, filed on Aug. 17, 2016.

(30) Foreign Application Priority Data

Sep. 24, 2015 (DE) .................. 10 2015 218 317

(51) Int. Cl.
| | | |
|---|---|---|
| *H01F 38/14* | (2006.01) | |
| *H02J 7/02* | (2016.01) | |
| *H01F 3/08* | (2006.01) | |
| *H01F 41/02* | (2006.01) | |
| *H02J 7/00* | (2006.01) | |

(Continued)

(52) U.S. Cl.
CPC .............. *H01F 38/14* (2013.01); *B60L 53/12* (2019.02); *H01F 3/08* (2013.01); *H01F 41/0246* (2013.01); *H02J 7/0042* (2013.01); *H02J 7/025* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ........................................................ H01F 38/14
USPC ........................................................ 320/108
See application file for complete search history.

(56) References Cited

U.S. PATENT DOCUMENTS

| | | |
|---|---|---|
| 3,840,624 A | 10/1974 | Tombs |
| 2006/0209487 A1 | 9/2006 | Schmidt et al. |
| 2007/0007678 A1 | 1/2007 | Benitsch |

(Continued)

FOREIGN PATENT DOCUMENTS

| | | | |
|---|---|---|---|
| AT | 315 522 B | 5/1974 | |
| CA | 2520606 A1 * | 10/2004 | ......... C04B 35/2633 |

(Continued)

OTHER PUBLICATIONS

German-language Office Action issued in counterpart German Application No. 10 2015 218 317.3 dated Aug. 2, 2016 (8 pages).

(Continued)

*Primary Examiner* — Edward Tso
*Assistant Examiner* — Ahmed H Omar
(74) *Attorney, Agent, or Firm* — Crowell & Moring LLP (57) ABSTRACT

A coil unit for inductive transfer of energy has an induction coil and a ferrite core which cooperates with the induction coil. The ferrite core is produced from a fiber reinforced ceramic material. A motor vehicle is equipped with such a coil unit.

17 Claims, 6 Drawing Sheets

(51) Int. Cl.
  *H02J 50/10* (2016.01)
  *B60L 53/12* (2019.01)

(56) References Cited

U.S. PATENT DOCUMENTS

| | | | |
|---|---|---|---|
| 2013/0249304 A1* | 9/2013 | Keeling | H01F 41/005 |
| | | | 307/104 |
| 2014/0084697 A1 | 3/2014 | Yasuda et al. | |
| 2014/0253278 A1 | 9/2014 | Elias et al. | |
| 2016/0297306 A1 | 10/2016 | Herzog et al. | |
| 2017/0033606 A1* | 2/2017 | Maikawa | H02J 50/70 |
| 2018/0005747 A1* | 1/2018 | Shijo | H01F 38/14 |

FOREIGN PATENT DOCUMENTS

| | | |
|---|---|---|
| DE | 103 12 284 A1 | 10/2004 |
| DE | 102 08 991 B4 | 7/2007 |
| DE | 10 2011 116 250 A1 | 4/2013 |
| DE | 10 2013 101 152 A1 | 8/2014 |
| DE | 10 2013 226 830 A1 | 6/2015 |
| EP | 0 200 265 A1 | 12/1986 |
| EP | 2 620 960 A1 | 7/2013 |
| EP | 2 824 793 A1 | 1/2015 |

OTHER PUBLICATIONS

International Search Report (PCT/ISA/210) issued in PCT Application No. PCT/EP2016/069458 dated Nov. 22, 2016 with English translation (6 pages).

German-language Written Opinion (PCT/ISA/237) issued in PCT Application No. PCT/EP2016/069458 dated Nov. 22, 2016 (5 pages).

"Ferrite", Wikipedia, Aug. 2, 2016 with English translation (9 pages).

* cited by examiner

INDUCTION COIL UNIT HAVING A FIBER REINFORCED FERRITE CORE

CROSS REFERENCE TO RELATED APPLICATIONS

This application is a continuation of PCT International Application No. PCT/EP2016/069458, filed Aug. 17, 2016, which claims priority under 35 U.S.C. §119 from German Patent Application No. 10 2015 218 317.3, filed Sep. 24, 2015, the entire disclosures of which are herein expressly incorporated by reference.

BACKGROUND AND SUMMARY OF THE INVENTION

The invention relates to a coil unit for inductive energy transfer, a vehicle having such a coil unit and a method for manufacturing the coil unit.

Induction charging systems are used for non-contact charging of an electrical energy storage device of a motor vehicle, such as, for example, a lithium-ion battery. For charging, the motor vehicle, in which a secondary induction coil is arranged, is to be placed for a relatively long period of time over a primary induction coil that acts as a charging apparatus, which emits a modulating magnetic field.

Figure 1:
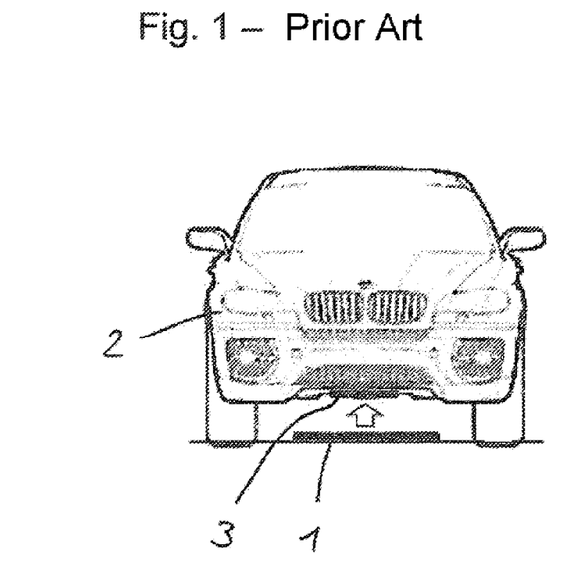
FIG. 1 shows an induction charging system from the prior art.

FIG. 1 shows, by way of example, a primary coil unit 1 arranged on or in the ground (e.g. road, parking lot, garage) and a secondary coil unit 3 arranged on the underbody of a vehicle 2. There is an air gap present between the primary and secondary coil units. On the one hand, the air gap should be as small as possible to achieve a high level of efficiency of the induction charging system and, on the other hand, it should be large enough in order not to present an obstacle for the vehicle 2, or cause damage due to the vehicle 2 driving over the primary coil unit.

Figure 2:
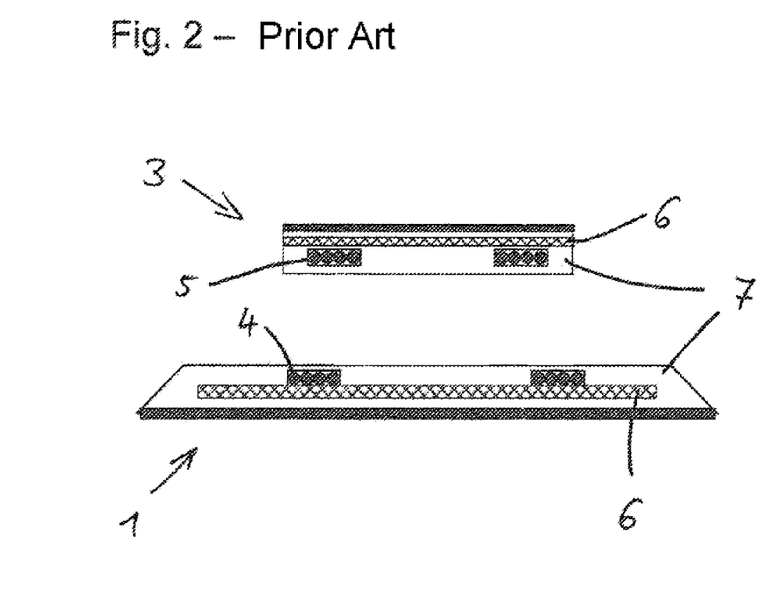
FIG. 2 shows the induction charging system from FIG. 1 in greater detail.

FIG. 2 shows the induction charging system from FIG. 1 in somewhat more detail. In the primary coil unit 1 and the secondary coil unit 3, a primary induction coil 4 and a secondary induction coil 5 are provided accordingly that are each wrapped around a vertical axis and designed to be as flat as possible in a vertical direction so that the coil windings extend horizontally. The primary induction coil 4 is essentially constructed to be equal to the secondary induction coil 5, however vertically mirrored, wherein the primary induction coil 4 is typically larger than the secondary induction coil 5. Ferrite cores 6 are provided to guide the magnetic field lines. For the protection of the primary and secondary induction coils 4, 5, the coils are each embedded in a casting compound 7 composed of a magnetically neutral material.

Figure 3:
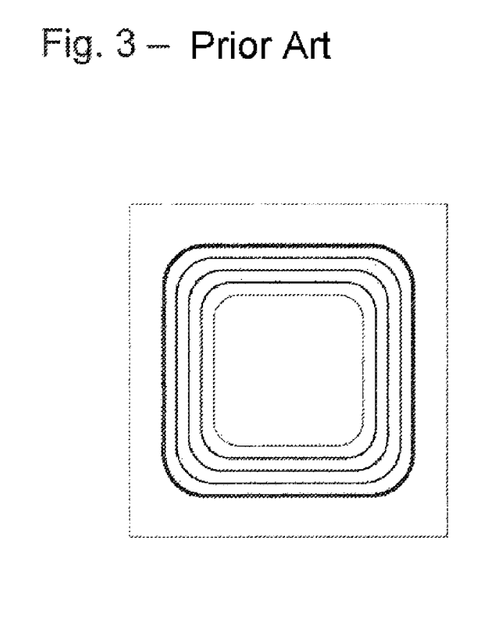
FIG. 3 is a cross-section top view of an induction coil of the induction charging system from FIG. 1.

FIG. 3 shows a cross-sectional top view of an induction coil, such as, for example, the primary induction coil 4 or the secondary induction coil 5. As an example, the coil can essentially be wound in a square or a round shape.

Figure 4:
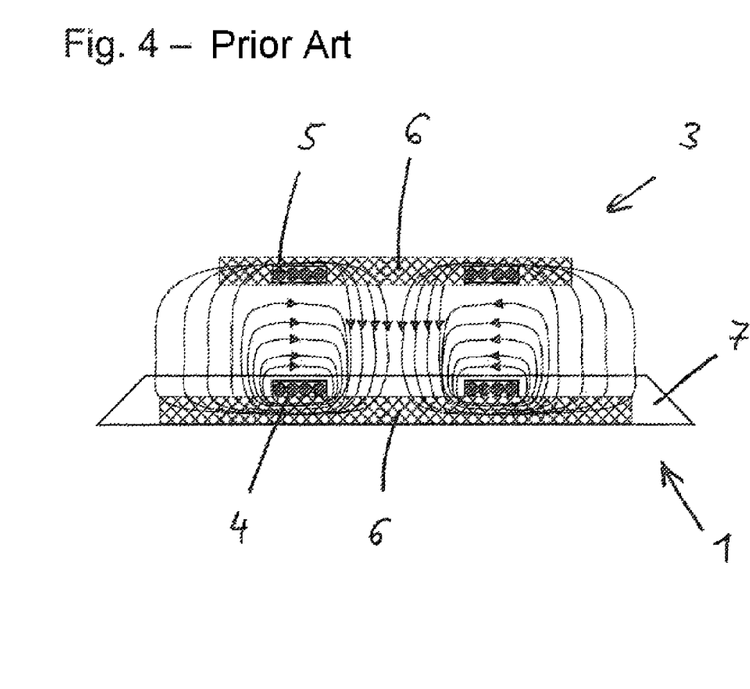
FIG. 4 shows a course of field lines while the induction charging system of FIG. 1 is operating.

FIG. 4 shows a course of the magnetic field lines while the induction charging system is operating. The primary induction coil 4 generates a magnetic field, the magnetic field lines of which are drawn in FIG. 4. Several of the field lines run through both the primary as well as the secondary induction coil 4, 5, whereas other field lines only run through the primary induction coil 4. The amount of field lines that only run through the primary induction coil 4 must be kept as few as possible to achieve a good level of efficiency. For example, this is achieved by arranging ferrite cores 6 that guide the field lines.

The ferrite core 6 forms an important part of the respective coil unit 1, 3, which increases the inductance of the induction coil 4, 5 and/or focuses/guides the magnetic field. Ferrite is a ceramic substance that conducts electricity poorly or not at all. Similar to conventional ceramics, ferrite compounds are deemed to be fragile due to their brittle structure. The manufacturing process is based mostly on sintering processes, whereby only simple shapes can be made. For generating complex end contours, the simple geometric structures must be arranged next to each other in a row; for example, two plates arranged at a right angle result in an orthogonal component.

A disadvantage of this prior art is that the manufacturing of complex ferrite core geometric structures is not possible. There is the danger of cracking or breaking due to the brittle fracture properties of this material. In turn, such cracks worsen the inductive and magnetic properties of the coil unit. Specifically for induction charging systems, the induction coils and therefore the ferrite cores are relatively large and very flat at the same time. In the case of such a geometric structure, the brittle fracture properties of ferrite are unfavorable.

The object of the invention is to create a coil unit for inductive transfer of energy, which offers better protection against mechanical damage. This object is achieved by a coil unit, and a method of making the coil unit in accordance with embodiments of the invention.

In accordance with an exemplary embodiment of the invention, a coil unit for inductive energy transfer is provided with an induction coil and a ferrite core that interacts with the induction coil, wherein the ferrite core is made of a fiber-reinforced ceramic material. As a result, a one-piece ferrite core can be created, which is characterized by a high level of stability. The advantages of such a ferrite core are in the preservation of magnetic and inductive properties of the ferrite core, even when subjected to high loads. In addition, with regard to force distribution, the ferrite core can be integrated within a supporting underbody structure of the vehicle. Furthermore, a reduction of the manufacturing costs could be achieved due to reducing the number of components, in the case of complex 3D structures in particular. Due to the optimized shape of the ferrite core, an improved system behavior can be expected, meaning a higher level of efficiency, better performance, etc. In addition, the robustness of the ferrite core increases the service life. Furthermore, due to the adapted shape, a reduction in weight and installation space can be achieved.

In accordance with a further exemplary embodiment of the invention, the fibers in the fiber-reinforced ceramic material are electrically non-conductive or insulated against each other.

In accordance with a further exemplary embodiment of the invention, the fibers in the fiber-reinforced ceramic material are carbon fibers.

In accordance with a further exemplary embodiment of the invention, the fibers in the fiber-reinforced ceramic material are glass fibers.

In accordance with a further exemplary embodiment of the invention, the fibers in the ceramic material are embedded in a slidable manner.

In accordance with a further exemplary embodiment of the invention, the fibers within a ferrite core are unidirectionally aligned.

Furthermore, the invention makes a vehicle having such a coil unit available.

In addition, an exemplary embodiment of the invention provides a method for manufacturing a coil unit for inductive energy transfer comprising the following acts: Sintering of a ferrite core, wherein, during the sintering process, fibers are pressed into a ceramic material; provision of an induction coil and attachment of the induction coil relative to the ferrite core. Using the method according to the invention, the aforementioned advantages associated with the apparatus according to the invention can be achieved.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 5:
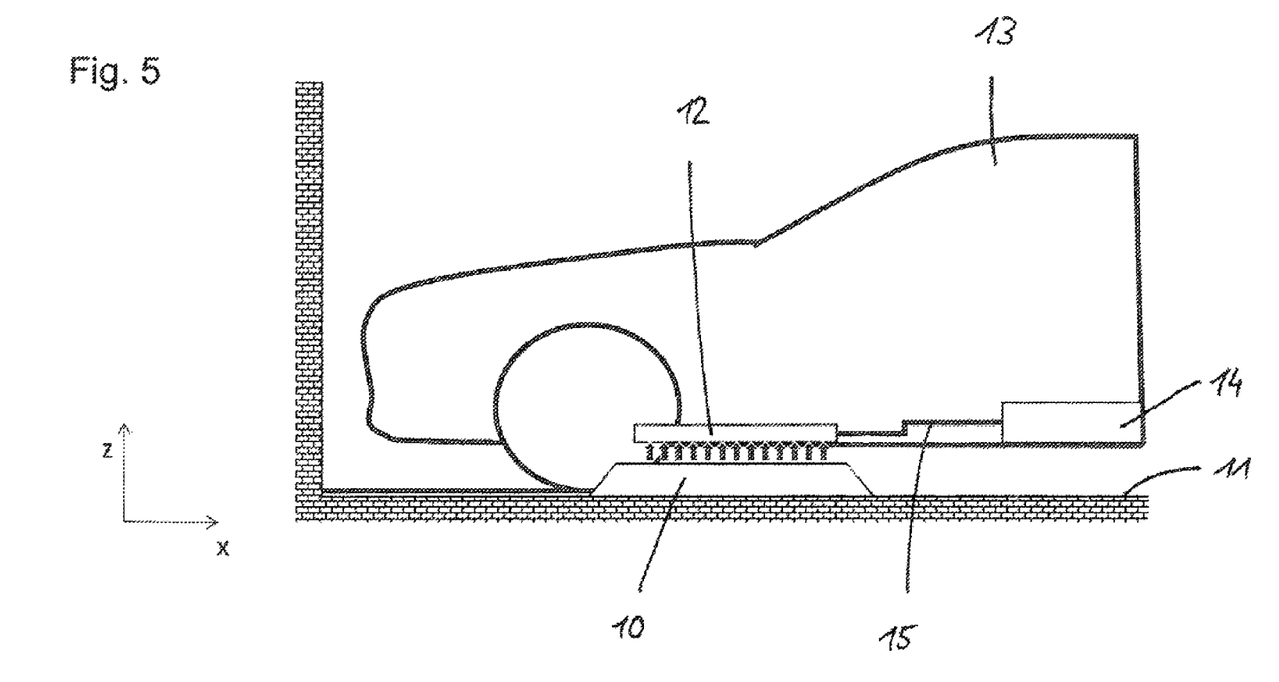
FIG. 5 shows a vehicle with an induction charging system according to the invention.

FIG. 5 schematically shows an induction charging system. The induction charging system includes a primary coil unit 10 that is installed in or on the ground 11, for example, a road, a parking lot, a parking area, or, as is suggested in FIG. 5, a garage floor. The primary coil unit 10 interacts with a secondary coil unit 12 that is provided on or in a motor vehicle 13. Preferably, the secondary coil unit 12 is installed on an underbody of the motor vehicle 13. The motor vehicle 13 has an electrical energy storage device 14, preferably a high-voltage battery, such as, for example, a lithium-ion battery that is electrically connected to the secondary coil unit 12 via an electric line 15 and can be inductively charged via the induction charging system. An air gap remains between the primary and the secondary coil unit. The primary coil unit 10 emits a modulating magnetic field to charge the energy storage device 14. By way of induction, the charging current required to charge the energy storage device 14 is thus generated in the secondary coil unit 12.

In the following, as an example, the construction of a coil unit according to the invention is described based on a secondary coil unit. This should, however, only serve as an example because the invention, particularly the design of the ferrite core, can also be used for the primary coil unit even if the advantage of a more stable coil unit is more substantial in the case of the secondary coil unit.

Figure 6:
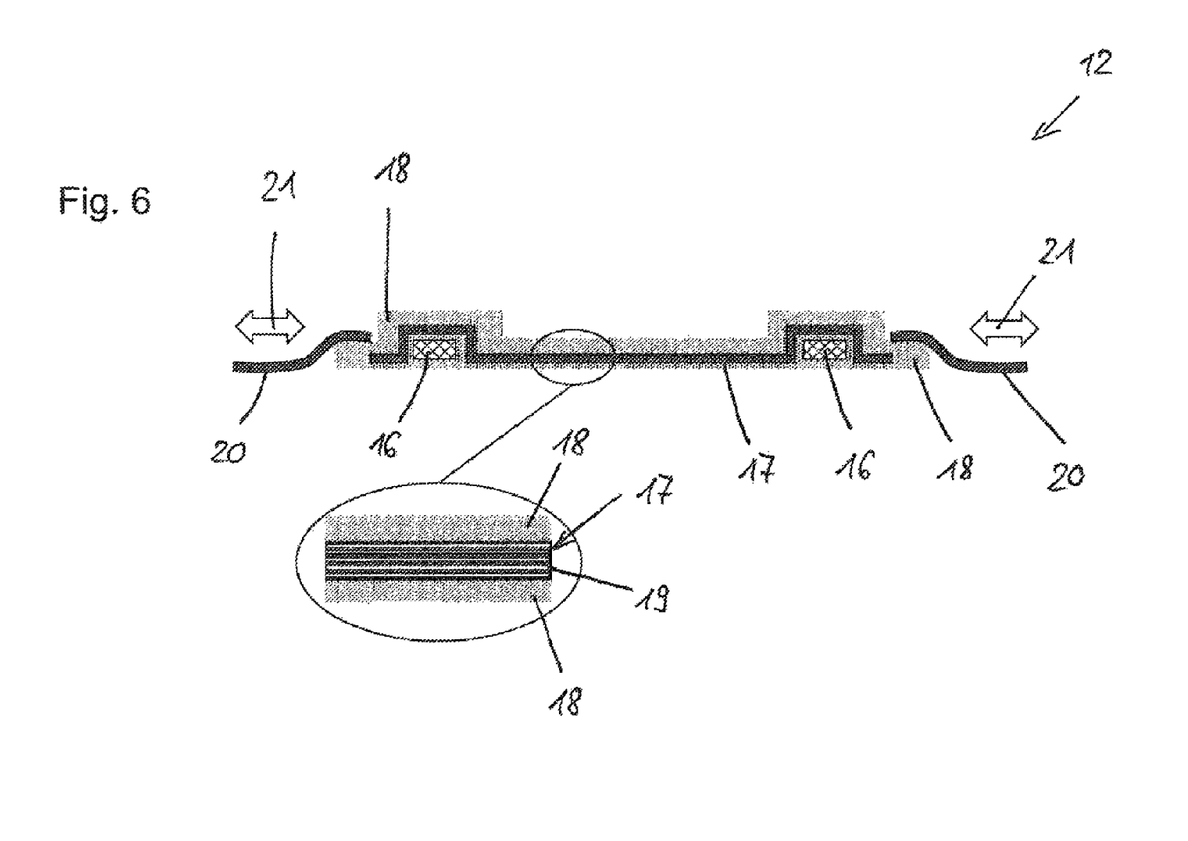
FIG. 6 shows a first exemplary embodiment of a coil unit of the induction charging system from FIG. 5 in greater detail with a detailed depiction of the ferrite core structure.

FIG. 6 shows a first exemplary embodiment of a coil unit, in particular of a secondary coil unit 12, of the induction charging system from FIG. 5 with a detailed depiction of the ferrite core structure. The secondary coil unit 12 includes a secondary induction coil 16, the windings of which are wrapped around a vertical axis (preferably parallel to a vehicle vertical axis z, see FIG. 2) as a center. Thereby, in a top view, the windings essentially form a square or a round shape, the middle of which is free. In the center of the secondary coil unit 12, a ferrite core 17 is arranged. This, along with the secondary induction coil 16, is embedded in a casting compound 18 made of a magnetically neutral material. The ferrite core 17 runs inside of the casting compound 18 on the side of the secondary coil unit 12 facing the primary coil unit 10, except in the area of the windings of the secondary induction coil 16 that are surrounded by the ferrite core 17 in such a way that the side of the windings of the secondary induction coil 16 facing the primary coil unit 10 remains free. Accordingly, the ferrite core 17 is not designed to be flat or shaped like a plate, but rather is flat outside of the coil windings and a recess is formed in the area of the coil windings, in which recess the coil windings are arranged. The recess corresponds to the shape of the coil windings. The ferrite core 17 is preferably made of a single piece, meaning a self-contained component that cannot be split in a non-destructive manner. Such a design is made possible by the ferrite core 17 being made out of fiber-reinforced ceramic. In FIG. 6, a detailed cross section shows the fibers 19 inserted into the ceramic material (shown as white lines and only one fiber is provided with a reference number for the sake of clarity).

The ferrite core 17 is manufactured within a single manufacturing process, particularly a sintering process. During the sintering process for the ferrite core 17, the fibers 19 are pressed into the ceramic material in near-net shape. The objective of the inserted fibers is to stabilize cracks already having formed during the sintering process, whereby the crack is prevented from spreading and the magnetic and inductive properties of the ferrite core 17 are preserved. Also, the breaking strength against subsequent mechanical influences can be increased.

The fibers are preferably glass fibers or carbon fibers. Glass fibers are electrically non-conductive and therefore do not generate any current loops, which, in turn, could lead to unwanted magnetic eddy currents. Carbon fibers are electrically conductive and therefore must be mutually insulated. Either all of the carbon fibers of the ferrite core 17 are insulated individually and/or they are cumulated into carbon fiber bundles of no more than 0.1 mm in diameter and these bundles are mutually insulated. The inventors have discovered that no magnetic eddy currents can form in the case of bundles up to this diameter or individual carbon fibers that do not come into contact with each other, because no current loops can form in the case of the conductive carbon fibers.

Preferably, the carbon fibers are unidirectionally aligned. As an example, all the fibers can be unidirectionally aligned within a ferrite core 17, meaning the longitudinal directions of the fibers run in the same direction. It is also possible to arrange the fibers in a plurality of positions, wherein the fibers of one position are unidirectional and the longitudinal directions of two adjacent positions intersect, for example, at an angle of 90°. Due at least to the mutual insulation, no current loops can form. The mutual insulation of the carbon fibers or bundles can, for example, be implemented by painting, coating or sheathing with an electrically non-conductive material. The fibers are embedded into the ceramic material in such a way that they are slidable with respect to the ceramic material. When aligning the fibers, care must be taken to ensure that the fibers are aligned as perpendicularly as possible to a potential crack formation in the ceramic material. This potential crack formation can be simulated or calculated based on the expected influences of forces.

The secondary coil unit 12 is arranged on an underbody 20 of the motor vehicle 13 and attached to the underbody. For example, the underbody 20, as illustrated, can be recessed in the area of the secondary coil unit 12 and the secondary coil unit 12 can be sunk into the underbody 20 so that the secondary coil unit 12 primarily runs flush with the underbody 20 on the vehicle underside. Due to the stable ferrite core 17 according to the invention, it is therefore possible that the secondary coil unit 12 forms part of the underbody and absorbs forces 21, in particular tensile, pressure and bending stress. In order to make this function possible, the casting compound 18 is made of fiber-reinforced composite material, for example a glass-fiber composite material.

For additional protection, the secondary coil unit 12 can be surrounded and protected by a housing structure not shown here.

Figure 7:
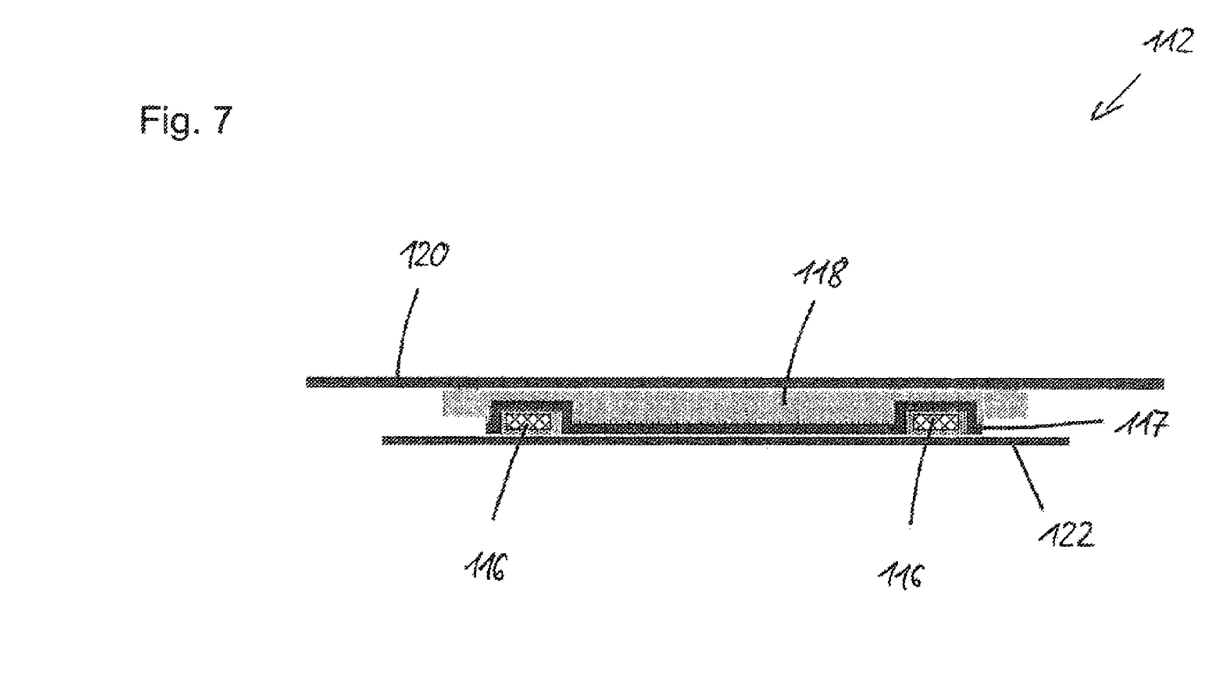
FIG. 7 shows a second exemplary embodiment of a coil unit of the induction charging system from FIG. 5 in greater detail.

FIG. 7 shows a second exemplary embodiment of a coil unit 112, in particular a secondary coil unit 112 of the induction charging system from FIG. 5, in greater detail. The secondary coil unit 112 includes a secondary induction coil 116 that corresponds to the secondary induction coil 16 and a ferrite core 117 that corresponds to the ferrite core 17. In contrast to the preceding exemplary embodiment, the secondary coil unit 112 is not sunk into the underbody of the motor vehicle 13, but attached to a support element 120. The support element 120 is designed and dimensioned to accommodate forces. The support element 120 can itself be the underbody of the motor vehicle 13 or it can be an additional component to be attached to the underbody, for example, a component made of aluminum. The secondary induction coil 116 and the ferrite core 117 are embedded in a casting compound 118 made of a magnetically neutral material. Since the casting compound 118 in this exemplary embodiment does not have to absorb as many forces as in the first exemplary embodiment, it can be designed to be less stable, for example, fiber reinforcement can be dispensed with. The less stable design of the casting compound 118 is compensated by an additional covering 122, which offers protection against mechanical damage. The covering 122 can be designed as a simple cover plate or in the shape of a housing shell. For example, the covering 122 can be made of a fiber-reinforced composite material, for example, a glass-fiber composite material.

Figure 8:
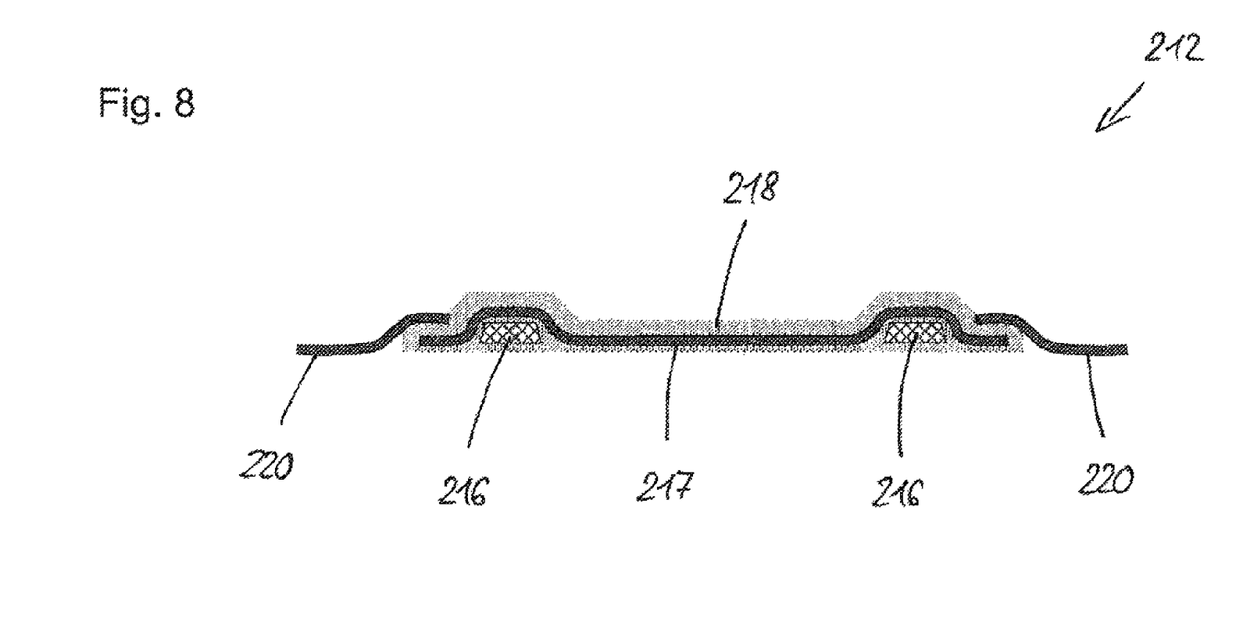
FIG. 8 shows a third exemplary embodiment of a coil unit of the induction charging system from FIG. 5 in greater detail.

FIG. 8 shows a third exemplary embodiment of a coil unit 212, in particular a secondary coil unit, of the induction charging system from FIG. 5, in greater detail. The third exemplary embodiment primarily corresponds to the first exemplary embodiment. In order to avoid repetition, only the differences with respect to the first exemplary embodiment are therefore described. Contrary to the first exemplary embodiment, the ferrite core 217 is designed with rounded-off corners. In the prior art, more complex shapes deviating from flat shapes were made by stringing together a plurality of smaller components. Since the ferrite core 217 according to the invention can be designed as a single piece, when designing ferrite cores, these can also have soft and better adapted contours with curves.

LIST OF REFERENCES

1 Primary coil unit
2 Vehicle
3 Secondary coil unit
4 Primary induction coil
5 Secondary induction coil
6 Ferrite cores
7 Casting compound
10 Primary coil unit
11 Ground
12 Secondary coil unit
13 Motor vehicle
14 Electrical energy storage device
15 Electric line
16 Secondary induction coil
17 Ferrite core
18 Casting compound
19 Fibers
20 Underbody
21 Forces
112 Coil unit
116 Secondary induction coil
117 Ferrite core
118 Casting compound
120 Support element
122 Covering
212 Coil unit
216 Secondary induction coil
217 Ferrite core
218 Casting compound
220 Underbody The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coil unit for inductive energy transfer, comprising:
an induction coil; and
a ferrite core that interacts with the induction coil, wherein
the ferrite core is made of a fiber-reinforced ceramic material;
fibers of the fiber-reinforced ceramic material are embedded in the ceramic material.

2. The coil unit as claimed in claim 1, wherein
the fibers in the fiber-reinforced ceramic material are electrically non-conductive or insulated against each other.

3. The coil unit as claimed in claim 2, wherein
the fibers in the fiber-reinforced ceramic material are carbon fibers.

4. The coil unit as claimed in claim 1, wherein
the fibers in the fiber-reinforced ceramic material are carbon fibers.

5. The coil unit as claimed in claim 2, wherein
the fibers in the fiber-reinforced ceramic material are glass fibers.

6. The coil unit as claimed in claim 1, wherein
the fibers in the fiber-reinforced ceramic material are glass fibers.

7. The coil unit as claimed in claim 2, wherein
the fibers in the fiber-reinforced ceramic material are embedded in a slidable manner.

8. The coil unit as claimed in claim 1, wherein
the fibers in the fiber-reinforced ceramic material are embedded in a slidable manner.

9. The coil unit as claimed in claim 2, wherein
the fibers in the fiber-reinforced ceramic material are unidirectionally aligned.

10. The coil unit as claimed in claim 1, wherein
the fibers in the fiber-reinforced ceramic material are unidirectionally aligned.

11. A vehicle, comprising a coil unit as claimed in claim 1.

12. A method for manufacturing a coil unit for inductive energy transfer, the method comprising the acts of:
sintering a ferrite core, wherein, during the sintering process, fibers are embedded in a ceramic material to produce a fiber-reinforced ceramic material;
providing an induction coil; and
attaching the induction coil relative to the ferrite core.

13. The method as claimed in claim 12, wherein
the fibers in the fiber-reinforced ceramic material are carbon fibers.

14. The method as claimed in claim 12, wherein
the fibers in the fiber-reinforced ceramic material are glass fibers.

15. The method as claimed in claim 12, wherein
fibers in the fiber-reinforced ceramic material are electrically non-conductive or insulated against each other.

16. The method as claimed in claim 12, wherein
the fibers in the fiber-reinforced ceramic material are embedded in a slidable manner.

17. The method as claimed in claim 12, wherein
the fibers in the fiber-reinforced ceramic material are unidirectionally aligned.

* * * * *